United States Patent
Miller et al.

[15] 3,707,672
[45] Dec. 26, 1972

[54] WEAPON DETECTOR UTILIZING THE PULSED FIELD TECHNIQUE TO DETECT WEAPONS ON THE BASIS OF WEAPONS THICKNESS

[72] Inventors: Robert C. Miller; Walter J. Carr, Jr.; George T. Mallick, Jr., all of Pittsburgh, Pa.

[73] Assignee: Westinghouse Electric Corporation, Pittsburgh, Pa.

[22] Filed: June 2, 1971

[21] Appl. No.: 149,226

[52] U.S. Cl. .......................... 324/41, 340/258 B
[51] Int. Cl. ......................................... G01r 33/00
[58] Field of Search ............... 324/41, 40, 3, 4, 7; 340/258 G, 258 C

[56] References Cited

UNITED STATES PATENTS 2,735,980  2/1956  Wait ............................................ 324/7
3,105,934  10/1963  Barringer ................................... 324/4
3,315,155  4/1967  Colani ........................................ 324/40
3,430,221  2/1969  Barringer et al. ...................... 324/41 X Primary Examiner—Robert J. Corcoran
Attorney—C. F. Renz, M. P. Lynch and F. H. Henson

[57] ABSTRACT

This invention is a metal detector which utilizes pulsed field techniques in order to detect the presence of metal objects and to provide discrimination between metal objects based on characteristics such as thickness, size and shape. An object to be monitored for metal content is subjected to pulsating magnetic fields. The rate of change of the magnetic field occurring at either the initiation or termination of magnetizing pulses is interpreted to identify the metal object in terms of thickness.

4 Claims, 5 Drawing Figures

PATENTED DEC 26 1972　　　　　　　　　3,707,672

WEAPON DETECTOR UTILIZING THE PULSED FIELD TECHNIQUE TO DETECT WEAPONS ON THE BASIS OF WEAPONS THICKNESS

BACKGROUND OF THE INVENTION

Prior art metal detectors function primarily to detect the presence or absence of metal and fail to provide discrimination capability whereby the metal object may be classified according to physical and material characteristics. One particular application for a metal detector exhibiting discriminatory capabilities currently exist in the air line security market as a means for screening passengers and luggage for possession of fire arms and explosive devices. While state-of-the-art metal detectors will provide an ambiguous yes-no indication, there exists a need for a device which provides discrimination and identification of concealed metal objects in order to avoid passenger inconvenience and delay. One such system which provides the desirable metal discrimination capability is the subject of copending patent application, Ser. No. 79,180 filed Oct. 6, 1970, entitled "Apparatus For Detecting Preselected Classes of Metal Objects" and assigned to the assignee of the present invention. This system subjects passengers and luggage to magnetic fields of more than one frequency and interprets in-phase and out-of-phase induced voltages resulting from these magnetic fields as an indication of the physical characteristics of concealed metal objects. The characteristics of detected metal objects are then compared to predetermined reference characteristics, which in the case of the application of the device as a gun detector correspond to characteristics of a gun.

SUMMARY OF THE INVENTION

This invention provides an alternate approach to that described in the above-identified pending application for detecting and discriminating between classes of metal objects on the basis of physical characteristics and material composition.

The technique for detecting metal objects comprising this invention employs means for subjecting a parcel or an individual person to rapidly changing magnetic fields, i.e. increasing or decreasing between predetermined levels. The class of metal objects under consideration will display a predetermined response to the changing magnetic field thus permitting the use of correlating circuitry which will generate a metal object acknowledgement signal when a metal object exhibiting the characteristics of the class of metal objects under consideration is detected.

According to the specific embodiment of the invention described below, a parcel or an individual person to be interrogated for concealed metal objects is subjected to a uniform static magnetic field for a period of time sufficient to establish a constant magnetic flux condition in the class of metal objects under consideration. The source of the magnetic field is then turned off resulting in the collapse of the magnetic field. The collapse in the magnetic field induces electric currents to flow in a concealed metal object. The rate of decay of magnetic flux is monitored and compared to data corresponding to the specific class of metal objects under consideration, i.e. guns, and the occurrence of a decay rate comparable to that corresponding to guns results in the generation of a concealed metal object detection signal.

The apparatus described below embodying this invention includes a probe type device comprising a transmitter coil and a receiver coil. The transmitter coil directs a uniform magnetic field in the direction of the object or individual under interrogation, while the search coil responds to the time rate of change of the magnetic flux following termination of the uniform magnetic field.

DESCRIPTION OF THE DRAWINGS

The invention will become more readily apparent from the following exemplary description in connection with the accompanying drawings which include.

DESCRIPTION OF THE PREFERRED EMBODIMENT

Figure 1:
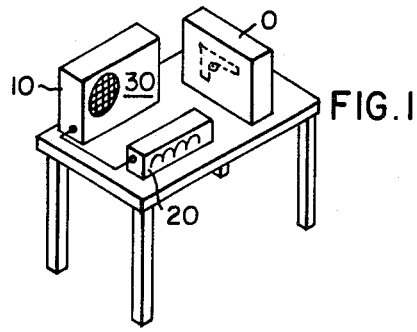
FIG. 1 is the pictorial representation of an embodiment of the invention.

Referring to FIG. 1 there is illustrated a pictorial representation of a metal detector apparatus 10 comprised of a probe unit 20 and excitation and monitoring circuitry 30. The probe unit 20 in response to excitation from the circuit 30 subjects a parcel 0 to changing magnetic fields and responds to the changes in the magnetic flux generated by concealed metal objects within the parcel by transmitting a signal proportional to the rate of change of this magnetic flux to the circuit 30. The circuit 30 responds to this signal by comparing it to a predetermined value corresponding to the class of metal objects of interest and generating an output alarm signal when this signal is indicative of the class of metal objects under consideration.

Figure 2:
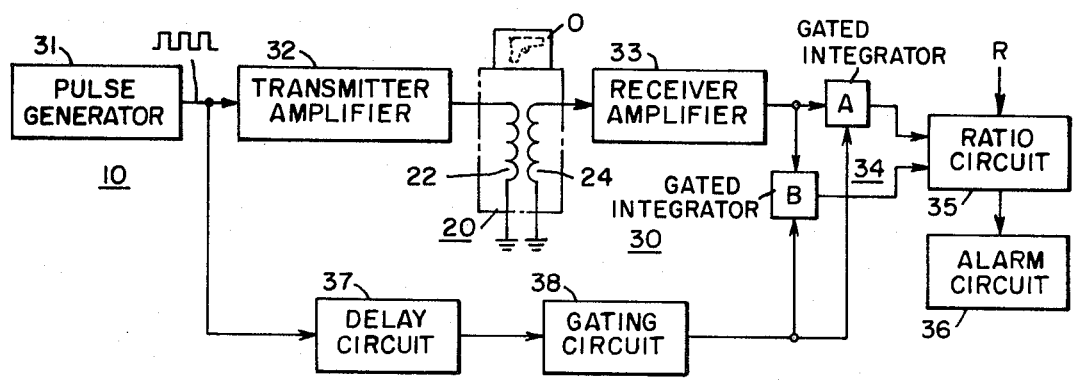
FIG. 2 is the block diagram schematic illustration of the embodiment of the FIG. 1.

The probe unit 20 and the excitation and monitoring circuit 30 of the metal detector apparatus 10 is illustrated schematically in the block diagram of FIG. 2.

The pulse generator 31 generates a train of output pulses of predetermined duration, frequency, shape and amplitude to the transmitter amplifier 32 which in turn amplifies the output pulses of the pulse generator 31 and supplies the amplified pulses to the transmitter coil 22 of the probe unit 20. The duration of the pulses supplied to the transmitter coil 22 are established to be sufficient to establish a magnetizing field for sufficient period of time in order to establish a quasi-equilibrium magnetic field within a metal object of the type under consideration. This establishes a steady state condition wherein the metal object is permeated by magnetic flux. The density of induced magnetic flux may be considerable, as in the case of a ferromagnetic object, or may be virtually identical to that of air as would be the case if the object were made of aluminum. The termination of the magnetizing pulse produced by the transmitter amplifier 32 results in a collapse of the magnetic field and the generation of an induced voltage in the receiver coil 24. The rate at which the magnetic field decays following termination of the magnetizing current pulse provides information whereby the metal object can be characterized according to material and thickness.

The induced voltage appearing in the receiver coil 24 is amplified by receiver amplifier 33 and supplied to a decay rate measuring circuit 34 which, through the operation of gated integrators A and B, functions to measure the decay of the induced voltage following termination of the magnetizing pulse. Circuit 34 transmits DC voltage signals A1 and B1, corresponding to the integral of the decay rate between predetermined time intervals following termination of the magnetizing pulse, to a ratio circuit 35. Ratio circuit 35 in turn functions to transmit an output signal to alarm circuit 36 when the ratio of the DC output signals A1 and B1 corresponds to a predetermined reference signal R which is indicative of the class of metal objects under consideration. The decay rate analysis provided by circuit 34 as described below is initiated by gating circuit 38 in response to an output pulse from pulse generator 31 which is delayed a predetermined period of time by delay circuit 37.

The collapsing magnetic field following termination of the magnetizing pulse induces electric currents to flow in the metal object under interrogation. Electric currents are induced in the metal object as a magnetic field changes from its initial steady state value to the final state of zero. The analysis of the induced currents provide information peculiar to the metal object under interrogation.

As an example, if a sphere of conductivity $\sigma$ permeability $\mu$ and radius r is subjected to pulse magnetizing as described above, the magnetic flux threading the sphere is described according to the following relationship, where the magnetic flux is measured from the instant the magnetizing pulse is terminated.

$$\text{Flux} = \phi a \sum_n a_n e^{-\frac{k_n^2 t}{4\pi\sigma\mu r^2}} \quad (1)$$

where $k_n$ is the $n$th root of the zero order spherical Bessel function, t is the time and $a_n$ is a coefficient.

The time rate of change of this magnetic flux is detectable by the receiver coil 24, and the induced signal so observed will contain terms with the same time dependence as given above, such as, $$c_n e^{-\frac{k_n^2 t}{4\pi\sigma\mu r^2}} \quad (2)$$

Figure 3:
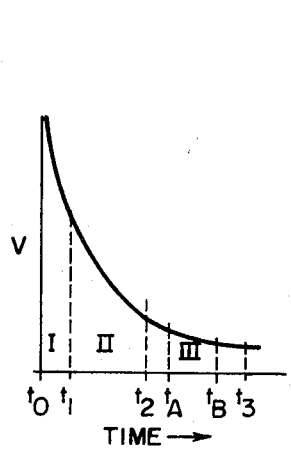
FIGS. 3 and 4 are graphical illustrations of the magnetic flux decay rate of various metal objects.

The voltage induced in the receiver coil 24 corresponding to the collapsing magnetic field is graphically illustrated in FIG. 3.

An analysis of the decaying induced voltage signals in the receiver coil 24 in the areas I, II, III defined between time $t_0$ and $t_1$, $t_1$ and $t_2$, and $t_2$ and $t_3$, respectively, discloses that the portion of the curve in area III can be accurately described by a single exponential function in contrast to a more complex description of the curved portion in areas I, II.

The simple single exponential function $$V(t) \approx A_1 e^{-\frac{k_1^2 t}{4\pi\sigma\mu r^2}} \quad (3)$$

permits simple circuit implementation of circuit 34 in order to extract information suitably characterizing the metal object under interrogation. While it is desirable to derive information pertaining to the class of metal objects in that portion of the curve where the simplest electronic circuitry can be utilized it is also apparent that usable information can be derived from the other portions of the curve through the use of more complex measuring circuits. Continuing the analysis of the sphere, based upon the assumption of a single exponential decay, if the induced voltage of FIG. 3 is measured at times $t_A$ and $t_B$ the ratio of these instantaneous voltages $V_A$ and $V_B$ can be expressed as $$\frac{V_A}{V_B} = e^{-\frac{k_1^2}{4\pi\sigma\mu} \frac{(t_A - t_B)}{r_1^2}} = R_1 \quad (4)$$

The same voltage ratio for a second sphere having a radius $r_2$ would be represented as $$R_2 = e^{-\frac{k_1^2 (t_A - t_B)}{4\pi\sigma\mu r_2^2}} \quad (5)$$

It is apparent from equations 4 and 5 that the ratio $R_2$ would be greater than the ratio $R_1$ if the radius $r_2$ was greater than the radius $r_1$. This relationship is true regardless of the precise position of the sphere in the magnetic field. It is likewise apparent from the review of equations 4 and 5 that the respective voltage ratios are quite sensitive to the thickness of the spheres since the voltage ratios vary as a function of the square of the radius $r$ of the spheres. While the above relationships and descriptions are related to spheres, similar expressions and relationships apply to any configuration of metal. These relationships apply to diamagnetic as well as ferromagnetic metals.

For the purposes of defining the operation of the metal detector 10 assume an application wherein it is desirable to distinguish between an aerosol can concealed within a package and a small fire arm concealed within a package. The rate of decay of induced voltage corresponding to an aerosol can is graphically illustrated in FIG. 4 while the decay rate of induced voltage corresponding to a gun is graphically illustrated in FIG. 5B. It is apparent from FIGS. 4 and 5B that the slope of the voltage decay with respect to time between times $t_0$ and $t_1$ is quite similar for the aerosol can and the gun thereby rendering the relative information available from these portions of the curves inconclusive. It is apparent however that for longer periods of time such as $t_2$, which for guns corresponds to approximately 500 microseconds, that a discernable difference exists between the slopes of the curves of FIGS. 4 and 5A. The measurable difference in the decay rate of the selected classes of metal objects, i.e. aerosol cans and small arms, between times $t_2$ and $t_3$ provides the information required for distinguishing between classes of metal objects.

Figure 5:
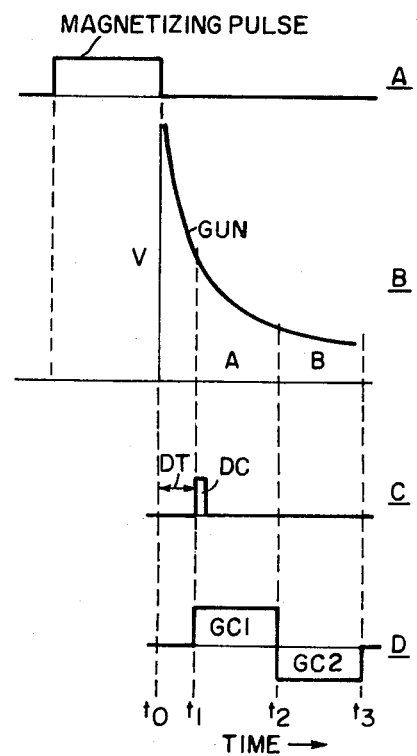
FIGS. 5A, 5B and 5C are graphical illustrations of the operation of the embodiment of FIG. 2.

Referring to FIGS. 5A, 5B, 5C and 5D there is illustrated graphically the operation of a metal detector 10. The termination of the magnetizing pulse from pulse generator 31 as illustrated in FIG. 5A results in the collapsing of the magnetic field and the generation of the induced voltage in the receiver coil 24 corresponding to the curve of FIG. 5B. The delay circuit 37 responds to the termination of the magnetizing pulse from the pulse generator 31 by transmitting an activating signal DC illustrated in FIG. 5C at a time DT following termination of the magnetizing pulse which corresponds to the time lapse between $t_0$ and $t_1$ of FIG. 5B. The duration of the time DT is sufficient to assure that analysis of the collapsing magnetic field is conducted in the area of the curve illustrated in FIG. 5B which is defined as the single exponential portion of the curve. The gating circuit 38 responds to the output signal DC of the delay circuit 37, as illustrated in FIG. 5D, by generating first a positive output pulse GC1 which functions to activate positive gated integrator A of circuit 34 for a period of time corresponding to the time between $t_1$ and $t_2$ of FIG. 5B. During this time integrator A develops a DC output signal A1 corresponding to the area A defined beneath the curve of FIG. 5B. Following termination of the positive output pulse GC1 the gating circuit 31 initiates a negative output pulse GC2 which activates negative gated integrator B for a time corresponding to the time lapse between $t_2$ and $t_3$ of FIG. 5B. Integrator B in turn develops a DC output signal B1 corresponding to the area B beneath the curve of FIG. 5B. The DC signals A1 and B1 are supplied to ratio circuit 35 which compares the ratio of the signals A1 and B1 to the predetermined reference value R. If the ratio of the DC signals A1 and B1 establish a predetermined relationship with the reference value R, the ratio circuit 35 transmits an activating signal to the alarm circuit 36 which in turn responds by generating an alarm manifestation indicative of the presence of a metal object within the class of metal objects under consideration.

Figure 4:
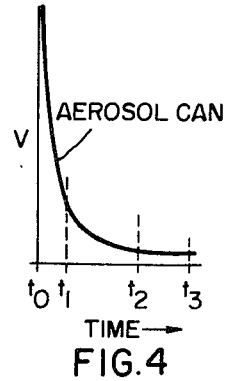

While the mere magnitude of either of the DC signals A1 and B1 could be interpreted to characterize metal objects under evaluation, this measurement would not compensate for relative size of the metal object and distance of the object from the probe 20. The interpretation of the ratio of the magnitudes of the signals A1 and B1 renders the detection of concealed metal objects independent of relative size and distance. The measurement of the ratios of portions of the curve of FIG. 5B is in fact a measurement of the slope of the curve. It is apparent from FIGS. 4 and 5B that within the same time intervals $t_2$ and $t_3$ the slope corresponding to the aerosol can of FIG. 4 is relatively flat in comparison to the slope of the curve of FIG. 5B corresponding to the gun.

The amplitude, duration and wave shape of the magnetizing pulses generated by pulse generator 31 are critical in this embodiment where decreasing rate of change of magnetic flux is monitored. Each pulse must develop a sufficient magnetic field to establish a steady state magnetization level in the metal object under consideration, and the trailing edge of the pulse should be sufficiently sharp so as to drop to zero as quickly as possible in order to not interfere with the analysis of the decay rate of the magnetic flux as monitored in terms of the voltage induced in receiver coil 24. In practice the square wave pulse has proven most appropriate in that the steady state DC level is established over a predetermined duration of the pulse. The trailing edge of the square wave pulse provides a sharp drop from one DC level to another level or zero. While a single pulse is sufficient to provide the magnetizing flux decay rate information required for classification of the metal object by the circuit 34, comparator circuit 35 and alarm circuit 36, a train of magnetizing pulses provides improved metal object discrimination in that analysis of the metal object based on a plurality of pulses improves the signal to noise ratio of the circuit 30. It is necessary that the time duration between the pulses be sufficient to permit operation of the circuit 34, comparator circuit 35 and alarm circuit 36. A repetition rate of approximately 100 hertz has proven acceptable.

The range of the metal detector 10 is a function of the diameter of the coil configuration comprising the magnetic probe unit 20 and the size of the metal object. Therefore in portable applications of the metal detector, where the probe unit 20 and the circuitry 30 is to be carried by an operator, the size of the coil configuration, which is typically a closed rectangular loop, is restricted thereby limiting the effective range of the metal detector 10 to a few feet.

What is claimed is:

1. Apparatus for monitoring a subject to detect the presence of a weapon on the basis of thickness comprising, first means for subjecting said subject to a rapidly changing magnetic field, second means for measuring a rate of change of magnetic flux within said subject immediately subsequent to the change in the magnetic field, said second means including a first integrator means for generating a first DC signal corresponding to said rate of change of magnetic flux during a first time interval and a second integrator means for generating a second DC signal corresponding to the rate of change of magnetic flux during a second time interval, and third means for evaluating said first and second DC signals to determine if said subject contains a weapon, said third means including means for determining the ratio of said first and second DC signals and producing an output signal indicative of the relative thickness of a metal object associated with said subject, means for providing a reference signal indicative of the thickness of a weapon, and means for comparing said output signal indicative of the thickness of the metal object associated with said subject to said reference signal, said means for comparing developing an output signal indicative of the presence of a weapon when a predetermined relationship exists between said output signal indicative of the thickness of the metal object associated with said subject and said reference signal.

2. Apparatus as claimed in claim 1 wherein said first means subjects said subject to a pulsed magnetic field changing from a first predetermined value to a second predetermined value.

3. Apparatus as claimed in claim 2 wherein said first and second predetermined values correspond to steady state magnetic flux conditions within said subject.

4. Apparatus as claimed in claim 1 wherein said weapon is a hand gun and said reference signal is a value corresponding substantially to the thickness of a hand gun such that the output signals from said means for comparing identifies the presence of a hand gun within said subject.

* * * * *